3,591,396
NOVEL COMPOSITIONS CONTAINING TETRAISO-
PROPYLNAPHTHALENE
Seymour W. Ferris, deceased, late of Vincentown, N.J., by Lucretia G. Ferris, executrix, Vincentown, N.J., and Ernest P. Black, West Chester, and Andrew J. Bozzelli, Springfield, Pa., assignors to Sun Oil Company, Philadelphia, Pa.
No Drawing. Original application Nov. 24, 1967, Ser. No. 685,712, now Patent No. 3,474,925. Divided and this application Mar. 5, 1970, Ser. No. 18,358
Int. Cl. C08h 11/00
U.S. Cl. 106—230   5 Claims

ABSTRACT OF THE DISCLOSURE

This invention relates to novel compositions having improved resistance to liquid water. Specifically the invention relates to slow release fertilizer compositions containing one or more isomers of tetraisopropylnaphthalene.

CROSS REFERENCE TO RELATED APPLICATIONS

This application is a division of our application Ser. No. 685,712, filed Nov. 24, 1967, now Pat. No. 3,474,925.

This invention relates to novel compositions having improved resistance to liquid water and other aqueous fluids and to methods of their preparation. The compositions of the invention contain urea or an adduct of urea and paraffin wax as the active fertilizer ingredient. In addition to the active fertilizer ingredient, the compositions of the present invention contain tetraisopropylnaphthalene which has been found to provide improved water resistance.

Nitrogen, potassium, and phosphorous are essential elements for plant growth. Commercially available fertilizers contain one or more of these elements. Examples of the fertilizers in frequent use at the present time include urea, ammonium nitrate, potassium chloride, sodium nitrate, monoammonium phosphate, diammonium phosphate, potassium sulfate, calcium cyanamide, potassium phosphate, potassium nitrate, superphosphate (a mixture of calcium acid phosphate and calcium sulfate), and triple superphosphate (calcium acid phosphate). Urea is a preferred fertilizer because it contains a higher percentage of nitrogen than the other nitrogen compounds mentioned.

The number of fertilizer compounds applied to the soil at a given time depends mainly upon the soil analysis and the crops to be grown. In some cases only nitrogen is needed; hence only a nitrogen fertilizer is applied. In the majority of cases, however, all three of the essential elements are needed and in such cases the fertilizer actually applied to the soil is a blend of a nitrogen fertilizer, a potassium fertilizer, and a phosphorus fertilizer. Some compounds such as diammonium phosphate contain more than one essential element. A fertilizer containing all three essential elements is conventionally referred to as a complete fertilizer. Most conventional fertilizers, whether complete or otherwise, contain some inert material added to maintain the percentage of the essential elements present in the fertilizer at a relatively low level in an attempt to avoid excessive local concentration of, say, nitrogen in the soil which may result in "burned" crops.

Unfortunately most of the commercial fertilizers mentioned above are readily water soluble, thus creating a number of disadvantages. In a heavy rainfall much of the fertilizer may be dissolved in the rainwater and soaked into the ground below the plant roots or rapidly transported away by flowing surface water. This fertilizer never becomes available to the plants. Another disadvantage is that the fertilizer often becomes available to the plant too rapidly resulting in injury to the plant rather than benefit. This is often noticed in "burned" lawns or crops.

One method of reducing the rate at which the fertilizer, e.g., urea, is consumed or washed away is to disperse it in a wax composition. The urea is dispersed in molten wax and the resulting slurry is formed into small particles in a mold. The particles are then allowed to cool. The resulting composition is a dispersion of solid urea particles is solid wax useful as a slow release fertilizer.

In areas of heavy rainfall the wax content of a slow release fertilizer is relatively high in order to provide a satisfactory reduction in the rate at which the fertilizer is released to the plants. The relatively high proportion of wax may make the fertilizer too expensive for commercial acceptance. Fertilizer compositions containing a relatively low amount of wax and yet having a high resistance to leaching by water are desirable. A means of improving the water resistance of the urea-wax fertilizer is also desirable.

It has now been discovered that the water resistance of wax-urea compositions can be improved by replacing some or all of the wax with tetraisopropylnaphthalene (TIPN). Although all of the wax can be replaced by TIPN, preferably only a minor amount, most preferably 1 to 20 percent by weight of the wax, is so replaced. If only a minor amount of the wax is being replaced with TIPN, any particular isomer thereof can be used but preferably the 1,3,5,7-isomer is employed. Most preferably the TIPN used is a mixture containing 80 to 99 percent by weight of the 1,3,5,7-isomer and 1 to 20 percent of the 1,3,6,7-isomer. This mixture can be prepared by the alkylation of naphthalene with propylene in the presence of hydrogen fluoride. This reaction will give about 90 to 99 weight percent 1,3,5,7-tetraisopropylnaphthalene, 1 to 10 weight percent 1,3,6,7-tetraisopropylnaphthalene and small amounts of mixed tri-isopropylnaphthalenes and pentaisopropylnaphthalenes.

If all or more than a minor amount of the wax is to be substituted, the compound substituting a wax must have a melting point high enough so that the melting point of the coating phase of the resulting fertilizer composition is above the temperature at which the fertilizer will be used. For example, the 1,3,6,7-isomer of TIPN melts at about 93° C. and is suitable as the sole coating material for urea. Similarly, a mixture of wax and this isomer containing a major amount of the latter is suitable as the coating phase of a slow release fertilizer composition. Also the 1,3,5,7-isomer which melts at about 129° C. is suitable. The 1,3,5,7-1,3,6,7-isomer mixture described above is also suitable.

Other methods than that described above can be employed to produce tetraisopropylnaphthalenes useful in the present invention. U.S. Pat. 3,129,255 teaches the alkylation of naphthalene with propylene in the presence of an ethyl aluminum sesquichloridetitanium tetrachloride catalyst to give a product comprising about fifty weight percent 1,3,5,7-tetraisopropylnaphthalene. Chemical Abstracts, volume 50, columns 9353f to 9354b, teaches reacting isopropylchloride and naphthalene with aged $Al(HSO_4)Cl_2$ to give nearly 100 percent tetraisopropylnaphthalene, and Chemical Abstracts, volume 49, column 13192b to c, discusses the same reaction in more detail.

The present invention is directed to wax compositions which exhibit improved water resistant characteristics and which contain tetraisopropylnaphthalenes. The invention also relates to slow release fertilizer compositions containing tetraisopropylnaphthalene. The compositions can comprise urea or an adduct of urea and paraffin wax as the fertilizer ingredient combined with wax and tetraisopropylnaphthalene or tetraisopropylnaphthalene alone as the release agent. The improvement of the present invention resides in the presence of the tetraisopropylnaphthalene. The compositions to which this component can be added to impart improved water resistant characterististics are numerous. For example, U.S. Pat. 3,300,293 teaches fertilizer compositions comprising a dispersion of a urea-paraffin wax adduct in petroleum wax. These compositions can contain asphalt. They are prepared by reacting solid urea with molten paraffin wax until a urea-paraffin wax adduct is obtained. The reaction product is then cooled to a temperature below the melting point of said paraffin wax to give a dispersion of urea-paraffin wax adduct in solid wax.

U.S. Pat. 3,252,786 discloses slow release fertilizer compositions comprising a dispersion of solid urea in wax. The wax additionally contains a minor amount of a particular wood rosin. These compositions are prepared by heating paraffin wax to above its melting point, dissolving the wood rosin in the wax as an adduct inhibitor, dispersing solid urea in the molten wax and cooling the resulting dispersion.

The present invention comprises the compositions of these patents with the improvement that all or a portion of the petroleum wax in these compositions has been replaced with tetraisopropylnaphthalene. In this specification the term "tetraisopropylnaphthalene" means any of the known isomers of tetraisopropylnaphthalene as individual components or mixtures thereof.

When tetraisopropylnaphthalene replaces at least a portion of the wax in a composition comprising wax, urea and rosin, the amount of urea in the resulting composition is 5 to 80 parts, the total amount of wax, if any, tetraisopropylnaphthalene and rosin is 15 to 49 parts, and the amount of rosin is 2 to 20 percent based on the total weight of wax, if any, tetraisopropylnaphthalene and rosin. When the tetraisopropylnaphthalene replaces wax in a composition comprising a urea-paraffin wax adduct in wax, the amount of adduct is in the range of 5 to 99 parts, preferably 10 to 90 parts and the amount of tetraisopropylnaphthalene and wax, if any, is in the range of 1 to 40 parts, preferably 10 to 40. If asphalt is added to this composition, it is added in an amount to give 5 to 40 percent based on the total composition weight.

U.S. Pat. 3,205,061 teaches that in the preparation of slow release fertilizers, the adduction of urea and molten paraffin wax can be prevented or at least substantially delayed by incorporating a small amount of certain polyalkylaromatic hydrocarbons into the wax. The polyalkylaromatic hydrocarbons suitable in the process and compositions of this patent are defined as aromatic hydrocarbons having at least two alkyl groups attached to nuclear carbon atoms of one aromatic nucleus, the alkyl groups containing at least five carbon atoms. This teaching is in contrast to the present invention wherein a particular aromatic hydrocarbon having four alkyl groups of three carbon atoms attached to nuclear carbon atoms is incorporated into fertilizer compositions to surprisingly give compositions of improved water resistance.

The following examples specifically illustrate the present invention:

Examples I and II illustrate preparations of tetraisopropylnaphthalene compositions useful in the present invention.

EXAMPLE I

One mole (128 g.) of naphthalene and 45 moles of anhydrous hydrogen fluoride were charged into a 1 l. stirred Parr autoclave equipped with an internal cooling coil. Propylene was added with stirring at a rate of 1.0 to 1.5 moles per hour through a calibrated flowmeter at an initial pressure of 15 to 30 p.s.i.g. and the reactor temperature was maintained at ca. 20° C. The addition of propylene was continued over a period of 8 hours. Toward the end of the reaction the propylene flow had decreased to a fraction of the initial rate while the reactor pressure increased to 100 p.s.i.g.

The reaction mixture was quenched in ice-water and extracted with pentane. The organic layer was extracted with dilute sodium hydroxide solution then with water and dried over anhydrous potassium carbonate. Removal of the solvent in vacuo left a crystalline residue which was melted and heated at 250° C. for a 15 minute period under nitrogen. The crude solid obtained on the cooling of the melt weighed 296 g. and melted at 103 to 110° C. One crystallization from pentane raised the M.P. to 115 to 123° C.; 224 g. of material were recovered (76%).

Analysis of the purified sample:

| Tetra-isopropylnaphthalene: | Weight percent |
| --- | --- |
| 1,3,5,7- | 95.5 |
| 1,3,6,7- | 1.5 |
| Tri-isopropylnaphthalene ($x_1x_1x$-) | 1.5 |
| Penta-isopropylnaphthalene ($x_1x_1x_1x_1x$-) | 1.5 |

EXAMPLE II

Essentially the same reaction conditions and quantities of the reactants were used as in Example I; however, the work-up procedure included an additional recrystallization from acetone prior to the recrystallization from pentane. The purified solid melted at 117 to 124° and analyzed as follows:

| Tetra-isopropylnaphthalene: | Weight percent |
| --- | --- |
| 1,3,5,7- | 91.2 |
| 1,3,6,7- | 5.2 |
| Tri-isopropylnaphthalene ($x_1x_1x$-) | 2.0 |
| Penta-isopropylnaphthalene ($x_1x_1x_1x_1x$-) | 1.6 |

The purified samples from Examples I and II exhibited cooling plateaus at 119° C. and 117° C. respectively.

EXAMPLES III–IV

The following comparative examples illustrate the improved water resistance of wax compositions containing tetraisopropylnaphthalene. Two compositions were prepared. The first composition contained 60% urea and 40% coating. The coating was 90% paraffin wax, 5% asphalt and 5% rosin. When submerged in water for 500 hours, 40% of the urea was dissolved in the water. The second composition was the same except that all the paraffin wax was replaced by a mixture containing 90% of the same type paraffin wax and 10% tetraisopropylnaphthalene. The tetraisopropylnaphthalene contained 95.5% of 1,3,5,7-isomer, 1.5% of the 1,3,6,7-isomer and 3% impurities. When this composition was submerged in water for 500 hours only 10% of the urea was leached out. Thus the inclusion of the tetraisopropylnaphthalene in the composition substantially improved the water resistance of the composition.

EXAMPLES V TO XIV

Table I given examples of various compositions of the present invention. All of these compositions contain tetraisopropylnaphthalene and all exhibit improved water resistance compared to similar compositions which do not contain tetraisopropylnaphthalene.

TABLE I

| Example | Weight percent | | | | | | | | | |
|---|---|---|---|---|---|---|---|---|---|---|
| | 5 | 6 | 7 | 8 | 9 | 10 | 11 | 12 | 13 | 14 |
| Component: | | | | | | | | | | |
| 1,3,5,7-tetraisopropylnaphthalene | 20 | 4 | 4 | 4 | 4 | 9 | 9 | 10 | ---- | 35 |
| 1,3,6,7-tetraisopropylnaphthalene | 5 | 1 | 1 | 1 | 1 | 1 | 1 | ---- | 10 | 5 |
| Petroleum wax | 75 | 25 | 25 | 25 | 25 | 30 | 30 | 30 | 30 | ---- |
| Polymerized wood rosin (oxidized) | ---- | 70 | | | | | | | | |
| Hydrogenated wood rosin (oxidized) | | | 70 | | | | | | | |
| Alcohol esters of wood rosin (oxidized) | | | | 70 | | | | | | |
| Wood rosin metal salts (oxidized) | | | | | 70 | | | | | |
| Urea-paraffin wax adduct | | | | | | 60 | | | | |
| Urea | | | | | | | 60 | 60 | 60 | 60 |

What is claimed is:

1. A wax composition of improved resistance to liquid water comprising a major amount of petroleum wax and a minor amount of tetraisopropylnaphthalene.

2. A composition according to claim 1 comprising petroleum wax in an amount of 80 to 99 weight percent of the total composition, and tetraisopropylnaphthalene in an amount of 1 to 20 weight percent of the total composition.

3. The composition of claim 2 wherein the tetraisopropylnaphthalene comprises a mixture comprising 80 to 99 weight percent of 1,3,5,7-tetraisopropylnaphthalene and 1 to 20 weight percent 1,3,6,7-tetraisopropylnaphthalene.

4. A composition of improved resistance to liquid water comprising a major amount of the composition of claim 1 and a minor amount of a wood rosin selected from the group consisting of (1) polymerized wood rosin, (2) hydrogenated wood rosin, (3) mono and polyhydric alcohol esters of wood rosin, polymerized wood rosin and hydrogenated wood rosin, and (4) polyvalent metal salts of wood rosin, polymerized wood rosin, and hydrogenated wood rosin, each of (1), (2), (3) and (4) being partially oxidized to an extent equivalent to oxidation at 140° F. in the presence of air at atmospheric pressure under substantially static conditions, for a period of 1 to 8 days, the amounts being based on the total weight of rosin and the composition of claim 1, said partial oxiadtion being sufficient to increase the resistance to liquid water of said composition.

5. A composition of improved resistance to liquid water comprising a major amount of tetraisopropylnaphthalene and a minor amount of a wood rosin selected from the group consisting of (1) polymerized wood rosin, (2) hydrogenated wood rosin, (3) mono and polyhydric alcohol esters of polymerized, hydrogenated, and unmodified wood rosin, and (4) polyvalent metal salts of polymerized, hydrogenated, and unmodified wood rosin, each of (1), (2), (3), and (4) being partially oxidized to an extent equivalent to oxidation at 140° F. for a period of 1 to 8 days, said partial oxidation being sufficient to result in a decreased rate of leaching when said composition is contacted with water and petroleum wax.

References Cited

UNITED STATES PATENTS 2,091,180    8/1937    Magell _____ 106—230

MORRIS LIEBMAN, Primary Examiner

T. MORRIS, Assistant Examiner

U.S. Cl. X.R.

106—271

UNITED STATES PATENT OFFICE
CERTIFICATE OF CORRECTION

Patent No. 3,591,396               Dated July 6, 1971

Inventor(s) SEYMOUR W. FERRIS, by Lucretia G. Ferris, Executrix, ERNEST P. BLACK and ANDREW J. BOZZELLI It is certified that error appears in the above-identified patent and that said Letters Patent are hereby corrected as shown below:

a) No Drawing. Original application Nov. 24, 1967, Ser. No. 685,712, now Patent No. 3,617,238. Divided and this application Mar. 5, 1970, Ser. No. 18,358 b)     CROSS REFERENCE TO RELATED APPLICATIONS

This application is a division of our application Ser. No. 685,712, filed Nov. 24, 1967, now Pat. No. 3,617,238.

Signed and sealed this 20th day of August 1974.

(SEAL)
Attest:

McCOY M. GIBSON, JR.
Attesting Officer

C. MARSHALL DANN
Commissioner of Patents